United States Patent [19]
Strickland

[11] Patent Number: 5,782,202
[45] Date of Patent: Jul. 21, 1998

[54] AUTOMATIC WATERING DISH

[75] Inventor: George B. Strickland, Fayetteville, N.C.

[73] Assignee: Dogloo, Inc., Corona, Calif.

[21] Appl. No.: 415,258

[22] Filed: Apr. 3, 1995

[51] Int. Cl.$^6$ .................................................. A01K 7/00
[52] U.S. Cl. .................................................. 119/78
[58] Field of Search .......................... 119/78, 72, 74, 119/75, 76, 77

[56] References Cited

U.S. PATENT DOCUMENTS

| | | | |
|---|---|---|---|
| 3,823,692 | 7/1974 | Bowser | 119/78 |
| 3,841,268 | 10/1974 | Bunger | 119/78 X |
| 3,921,587 | 11/1975 | Schnee | 119/78 |
| 3,948,221 | 4/1976 | Wiuniski | 119/78 |
| 4,138,967 | 2/1979 | Tamborrino | 119/78 |
| 5,195,462 | 3/1993 | Gustin | 119/75 |

*Primary Examiner*—Thomas Price
*Attorney, Agent, or Firm*—Vance, Romero & Montague, P.S.

[57] ABSTRACT

An improved watering dish is provided for use with dogs and other animals. The watering dish is self-cleaning, and is provided with a float-activated valve that automatically replenishes the water supply in the drinking reservoir as that supply is depleted. The float is constructed so that it will not flip or otherwise become fouled, even if the watering dish is overturned. The valve is constructed so that it may be shipped as a separate element, but readily snaps into position in the watering dish during assembly and is thereafter essentially permanently fixed into place in an orientation conducive to the optimal performance of the device. The watering dish is also provided with fastening elements that permit it to be affixed to both vertical and horizontal substrates. The fastening means also allow the device to be attached to both hard and soft surfaces.

11 Claims, 3 Drawing Sheets

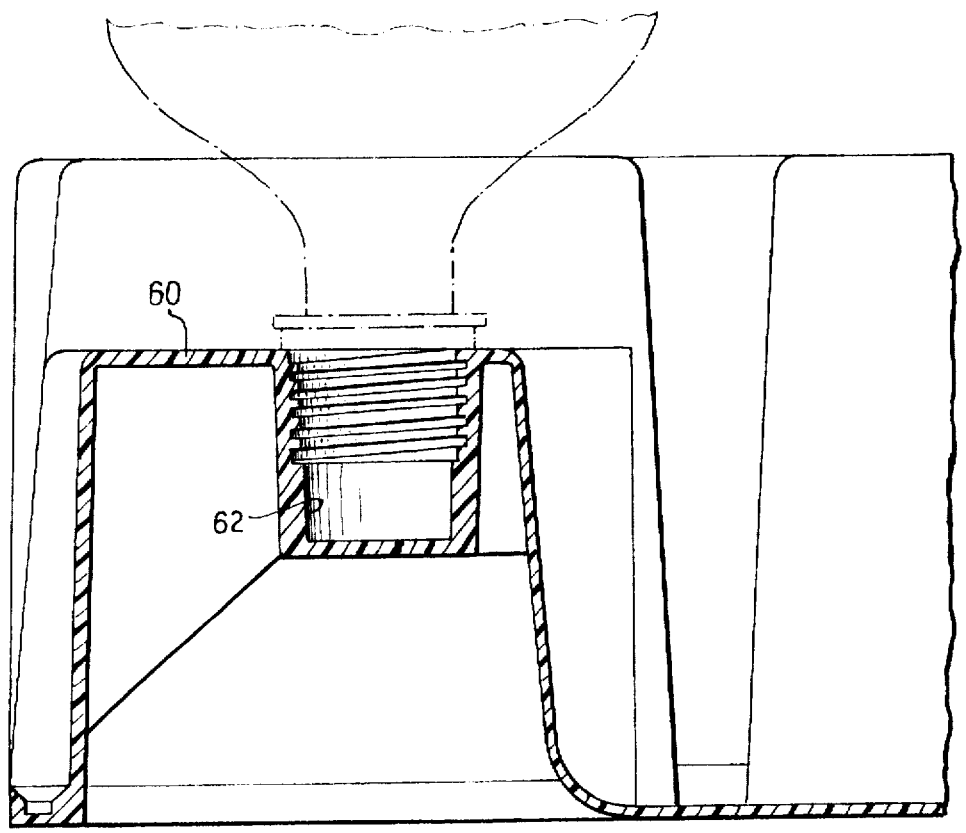
FIG. 4
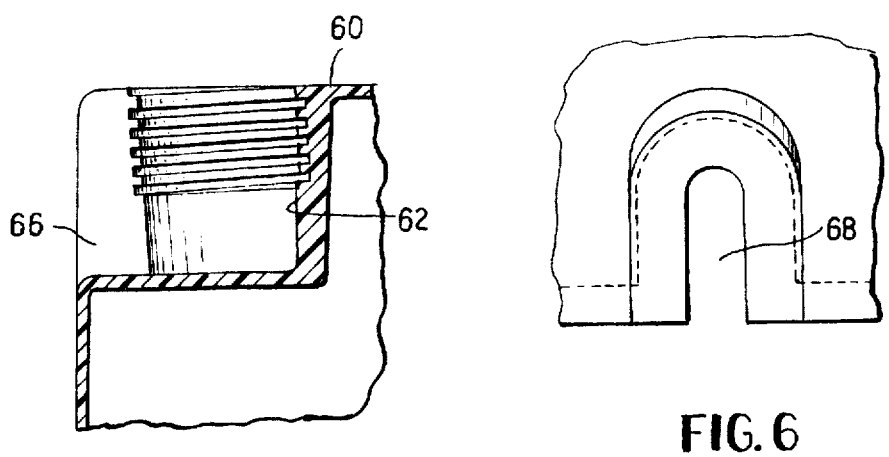
FIG. 5
FIG. 6

5,782,202

1
AUTOMATIC WATERING DISH

TECHNICAL FIELD

This invention relates generally to animal watering devices, and more particularly to an automatic watering dish.

BACKGROUND

Various types of automatic watering devices are known to the art for maintaining a ready supply of water for dogs and other animals. Most of these devices utilize float controlled valves or similar devices for detecting a drop in the water level of the drinking reservoir, and for releasing water into the reservoir from a water supply until the reservoir has been replenished. U.S. Pat. No. 4,254,794 (Smith) and U.S. Pat. No. 4,274,365 (Peters) are exemplary of this technology.

In some prior art watering dishes, the valve controlling the release of water from the water supply and into the drinking reservoir is controlled by a float mounted on a pivoting arm. To date, however, the use of such floats in watering dishes has often been problematic. To operate properly, the float must be maintained in a proper orientation with respect to the surface of the water. However, when the watering dish is overturned, the float tends to rotate around the pivoting arm in such a way that it is no longer properly oriented with respect to the surface of the water. Often, the float remains stuck in the overturned position, even after the watering dish is uprighted. There is thus a need for a watering dish that maintains the float in a proper orientation with respect to the surface of the water.

Another problem with existing automatic watering dishes relates to the disposition of the inlet nozzle. Most devices utilize a nozzle that extends from the side of the dish for connecting the device to a garden hose or other water supply. This nozzle is usually permanently fixed in place to afford good mechanical strength. However, the nozzle also gives the device an irregular profile, which significantly increases packaging costs. In addition, the protruding nozzle tends to catch on passing surfaces, resulting in damage to the watering dish during shipping and handling operations.

Many of these problems could be avoided if the inlet nozzle were provided as a separate component that could be easily snapped into place by the user. However, known watering dishes of this type are not comparable in mechanical strength to watering dishes wherein the inlet nozzle is permanently fixed in place.

Thus, for example, U.S. Pat. No. 4,274,365 (Peters) discloses a watering dish wherein the inlet valve can be removably placed along a vertical, sinusoidal groove in the wall of the valve chamber. The connection between the nozzle and the wall of the valve chamber where the groove is situated is flexible by design to enable the inlet nozzle to be shifted vertically along the groove. As a result, the nozzle tends to become displaced from the preferred orientation during use, as when there is a water surge. Also, the material in the area of the wall where the nozzle is situated undergoes constant flexing during use, eventually resulting in material fatigue and mechanical failure. There is thus a need for a watering dish equipped with an inlet nozzle, wherein the inlet nozzle can be shipped as a separate component that is readily snapped into place in the wall of the valve chamber, and wherein the inlet nozzle is thereafter rigidly, and essentially permanently, fixed in a proper orientation.

Another concern not addressed by the prior art relates to the tendency of automatic watering dishes to collect dirt, grass, and other debris in the valve chamber. Over time, this debris can accumulate and clog the valve mechanism or otherwise interfere with the proper operation of the device.

For example, U.S. Pat. No. 4,274,365 (Peters) discloses a watering dish with a valve chamber that has a bottom which is level with the drinking reservoir, and which is separated from the drinking reservoir by a short partition. This partition interrupts the flow of water through the valve chamber in such a way that debris tends to accumulate in the area of the valve chamber adjacent to the partition. There is thus a need for a watering dish that is selfcleaning in the sense that its construction causes debris that has accumulated in the valve chamber to be swept out into the open drinking reservoir, where it can be easily removed.

Yet another problem with prior art watering dishes relates to the need to secure these devices to a fixed substrate, such as the ground or floor. This prevents the watering dish from being overturned during use. To date, this need has been addressed by references such as U.S. Pat. No. 4,470,371 (Strickland), which teach the use of conical anchoring legs to anchor a watering dish to the ground. However, anchors of this type are not helpful in securing the dish to a wooden floor or a similar hard substrate. Furthermore, no provision has been made for securing watering dishes to a vertical substrate such as a wall. There is thus a need for a watering dish which can be secured to hard and soft surfaces, and which can further be secured to both vertical and horizontal substrates.

In light of the aforementioned infirmities in the prior art, it is an object of the present invention to provide a watering dish which is self-cleaning, and which automatically replenishes the water supply in the drinking reservoir as the water level in that reservoir subsides.

It is another object of the present invention to provide a watering dish with an inlet valve that snaps into place, and is thereafter essentially permanently and rigidly fixed into place in an optimum orientation.

It is yet another object of the present invention to provide a watering dish that can be secured to both hard and soft surfaces, and which can also be affixed to both horizontal and vertical substrates.

It is still another object of the present invention to provide a float-activated watering dish, wherein the construction of the float is such that the float will not be flipped or otherwise become fouled when the watering dish is turned over.

These and other objects are accomplished by the present invention, as hereinafter described.

SUMMARY OF THE INVENTION

The present invention is an improved automatic watering dish. The construction of the watering dish is such that any debris that enters the valve chamber will be swept out into the drinking reservoir by the inflowing water current, thereby preventing the debris from clogging the inlet valve mechanism.

The watering dish is provided with a float-activated valve that controls the flow of water into the drinking reservoir so that, as the water level in that reservoir subsides, the water supply in the reservoir is automatically replenished. The float is constructed so that it will not be flipped over by the inflowing water. In addition, the construction of the float allows for a minimum amount of materials to be used.

The watering dish is also provided with an inlet nozzle that can be shipped as a separate component, but which readily snaps into position in the wall of the valve chamber.

After the inlet nozzle is snapped into place, it is essentially permanently fixed in an orientation that is conducive to the optimal performance of the device. Inflowing water passes through an inlet tube that directs water against the bottom of the float chamber to flush debris out of the chamber.

The watering dish is provided with fastening means that permit it to be affixed to both vertical and horizontal substrates. The fastening means allow the device to be attached to both hard and soft surfaces.

BRIEF DESCRIPTION OF THE DRAWINGS

FIG. 4 is a cross section, taken along Line 4—4 of FIG. 1;

FIG. 5 is a cross section, taken along Line 5—5 of FIG. 1; and

FIG. 6 is a perspective view taken along Line 6—6 of FIG. 1.

DETAILED DESCRIPTION OF THE PREFERRED EMBODIMENT

Figure 1:
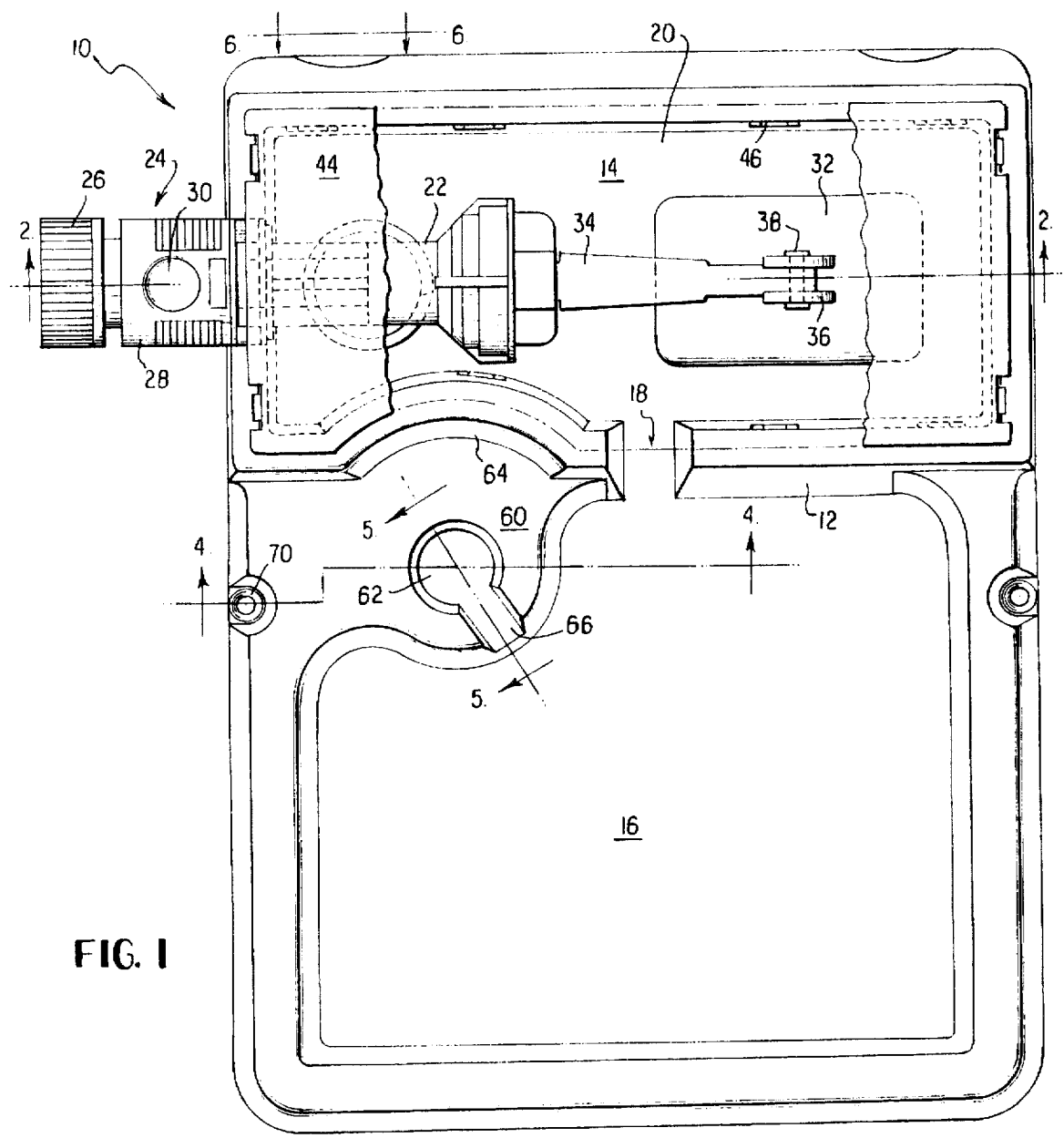
FIG. 1 is a top plan view of the watering dish of the present invention.

FIG. 1 illustrates the watering dish 10 of the present invention. The dish is provided with a central partition 12 which divides the interior of the dish into a valve chamber 14 and a drinking reservoir 16. The valve chamber houses the valve mechanism that controls the flow of water into the dish, while the drinking reservoir provides an open bowl from which an animal can drink. The partition is provided with an aperture 18 which extends from the floor 20 of the valve chamber and which allows the valve chamber and the drinking reservoir to be in open communication with each other.

The valve chamber is provided with an inlet 22 that houses a valve which controls the flow of water into the valve chamber. The inlet is equipped with a suitable adaptor 24 that allows the inlet to be attached to a water source. Preferably, the adaptor is equipped with a female member 26 that rotatingly engages the threaded male connector of a common garden hose or other water source. The adaptor may also be provided with a spring-loaded sleeve 28 that allows the adaptor to be easily disengaged from the inlet when the sleeve is advanced in the direction of the female member. A depression 30 is provided in the sleeve to facilitate the user's grip.

Figure 2:
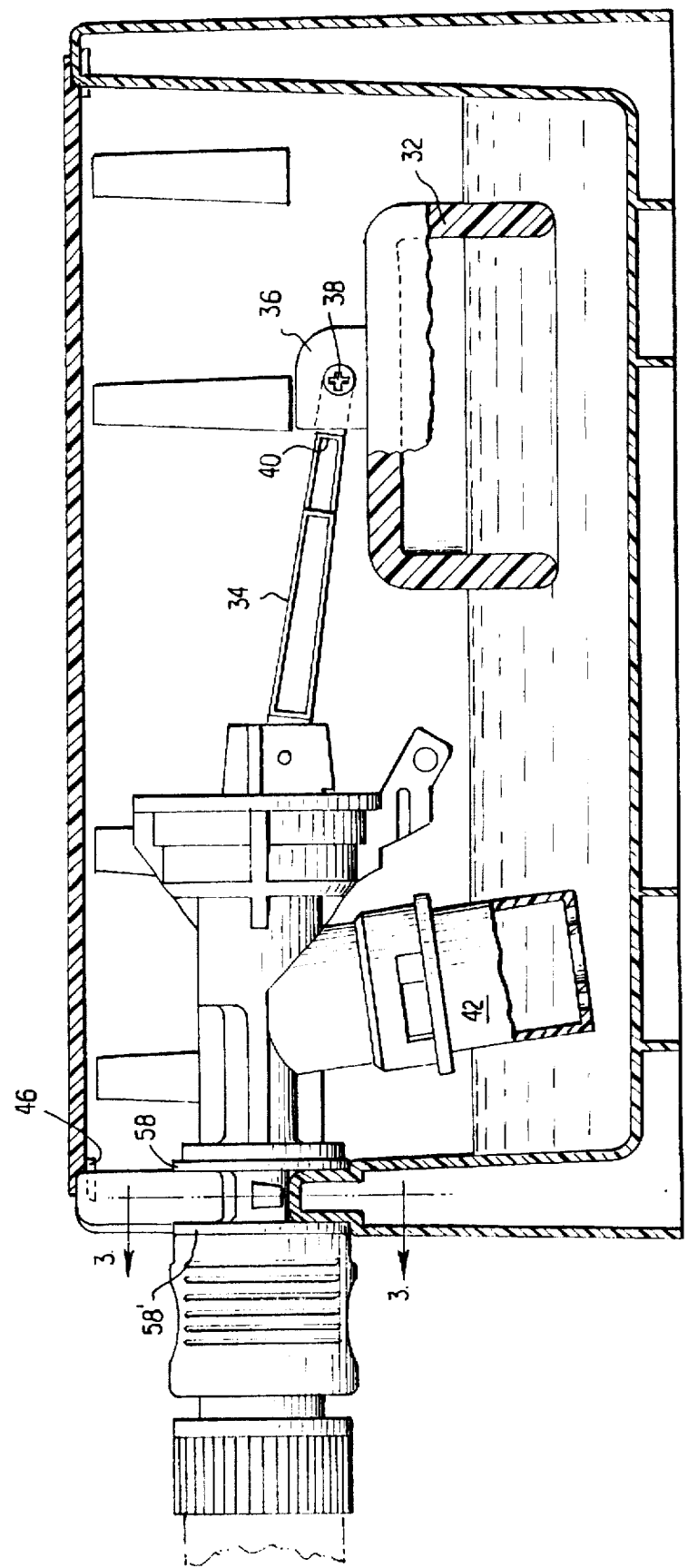
FIG. 2 is a view, partially in section, taken along Line 2—2 of FIG. 1.

As illustrated in FIGS. 1–2, the water level in the valve chamber is monitored by a float 32. The float is preferably made out of a buoyant material, such as foamed polystyrene or a similar plastic that does not readily absorb water and may be cast, molded, stamped, or carved into a convenient shape. The float, which rides the surface of the water within the valve chamber, is attached to a pivoting arm 34 that manipulates the valve within the inlet. As the water level within the valve chamber subsides, the weight of the float depresses the arm and opens the valve, causing water to flow from the water source and into the drinking reservoir by way of the valve chamber. When the water is replenished to a certain level in the drinking reservoir (and therefore in the valve chamber), the float raises the arm sufficiently so that the valve is closed, thereby cutting off the further flow of water into the valve chamber.

The float is provided with a sleeve 36 that is connected to the pivoting arm by a screw 38 or other suitable fastening means. The sleeve, when engaged with boss 40, limits the rotation of the float around the axis of the screw. This construction allows the bottom surface of the float to remain flush with the surface of the water in the valve chamber, even if the watering dish is placed on a slight incline, and prevents the float from being turned upside down by water flowing into the chamber.

FIG. 2 further illustrates the construction of the valve chamber, and how that construction cooperates with the design of the inlet to keep the valve chamber free of debris. The design of the inlet is such that, water passes through an inlet channel 42, directed toward the bottom of the valve chamber at an angle of slightly less than 90°. Since the bottom of the valve chamber is sloped in the direction of the aperture in the partition, any debris that has accumulated in the valve chamber will be swept by the current along the bottom of the chamber and into the drinking reservoir for easy removal.

Referring again to FIG. 1, the valve chamber is preferably provided with a cover 44 which prevents debris from entering the chamber and clogging the inlet valve. This cover is provided with one or more flexible tabs 46 that are removably received in a series of slits disposed on the side of the valve chamber. This construction permits the cover to be readily removed when it is desired to gain access to the interior of the valve chamber, as when the chamber is to be cleaned or when the watering dish is being assembled.

Figure 3:
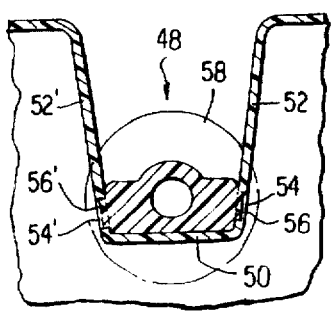
FIG. 3 is a sectional view taken along Line 3—3 of FIG. 2.

FIG. 3 illustrates another important feature of the present invention. A notch 48 is provided in one wall of the valve chamber to accommodate the inlet. The notch has a flat bottom 50 with rounded edges and opposing sides 52, 52' that open upwardly. A pair of small openings 54, 54' is provided near the bottom of the notch. The material of the wall into which the notch is set is preferably polyvinylchloride or a similar tough, hardened, rigid plastic.

Referring to FIGS. 2 and 3, the inlet is provided with a set of tabs 56, 56' which engage the openings in the notch. The outer surfaces of the tabs are tapered to assist in sliding the inlet into position. The area in which the tabs are located is bound by a pair of opposing flanges 58, 58', transversely disposed along the length of the inlet. When the watering dish is assembled by the user, this portion of the inlet is forced into the notch until the tabs snap into the depressions. Due to the hardness and relative inflexibility of the plastic from which the wall is composed, and the pair of flanges which press snugly against the opposing surfaces of the wall in the vicinity of the notch, the inlet is tightly secured in place in an essentially permanent manner. Furthermore, the mechanical integrity of the connection between the inlet and the wall is such that the portion of the wall around the inlet resists fatigue and mechanical failure, and is comparable in strength to arrangements wherein the inlet is molded as an integral part of the wall, is glued to the wall during manufacture, or is otherwise permanently affixed in place.

In addition, the depth of the notch, and the location of the openings in the notch, are such that the inlet assumes an optimal orientation, with respect to the valve chamber, when it is snapped into place in the notch. Thus, when the inlet is inserted into the notch, it will be oriented at a proper angle to the bottom of the valve chamber to ensure an optimal cleaning action, and will also be positioned to fill the drinking reservoir to a proper depth.

FIGS. 1, 4 and 5 illustrate a feature of the present invention which allows it to be used with alternative water sources. The reservoir is provided with an apron 60 which is equipped with a threaded aperture 62 for receiving a bottle of water. The wall of the valve chamber is fitted with a rounded depression 64 in the vicinity of the aperture to accommodate the bottle and secure it in place.

The threaded aperture has a slotted opening 66 which empties into the drinking reservoir. The radius of the threaded aperture is such that it will accommodate the neck of a standard sized bottle (i.e., the neck found on a 2-liter bottle of drinking water). Thus, when it is not desired to attach the watering dish to a hose or a similar supply of running water a bottle of water is threadingly engaged in the aperture. When the water in the reservoir falls below the bottle neck, the bottle will release enough water to return the water level to its former level. Among other advantages attendant to this feature, the watering dish may be used in any location, thereby increasing its portability.

FIGS. 1, 4 and 6 illustrate another unique feature of the present invention. From time to time, it may be desirable to secure the watering dish to a floor or wall or a similar vertical or horizontal surface. This is particularly so when the reservoir is being fed from a bottled water source, since the weight of the bottle will make it easier to upset the dish. To this end, the sides of the dish are supplied in appropriate locations with one or more U-shaped depressions 68 (see FIG. 6) that allows the dish to be easily mounted to a wall or similar vertical surface with bolts and/or lag screws, thereby securing the dish to the surface. A second set of depressions 70 are also provided (see FIGS. 1 and 4) which allow the dish to be secured to a floor or a similar horizontal surface.

The watering dish of the present invention may be constructed out of many suitable materials as are known to the art, although it is preferably constructed out of a tough, rigid plastic such as polyvinylchloride or an appropriate grade of polyethylene, particularly in the area where the inlet interfaces with the wall of the valve chamber. Various fillers or pigments may be used to confer a desired color or texture to the material used for the construction of the dish. The dish may also be decorated with decals or designs to improve its aesthetic appeal.

The dish may be molded with a hollow, ribbed construction as is known to the art (see FIGS. 1 and 2), thereby reducing the materials needed for its construction without sacrificing mechanical strength. In addition, the dish may be provided with various attachments, such as cork or rubber stoppers, to hold the dish in place on slippery surfaces.

The above disclosure is intended only to convey an understanding of the present invention to those skilled in the art, and is not intended to be limiting. It will be appreciated that various modifications to the disclosed embodiments are possible without departing from the scope of the invention. Therefore, the scope of the present invention should be construed solely by reference to the appended claims.

I claim:

1. A watering dish capable of holding water and debris, said watering dish comprising:

(a) a valve chamber having a bottom, (b) an inlet valve operatively connected to said valve chamber for supplying water to said valve chamber, (c) a drinking reservoir adjacent said valve chamber, and (d) a partition between said valve chamber and said drinking reservoir, said partition having an aperture therein for providing fluid communication between said valve chamber and said drinking reservoir, said bottom of said valve chamber being sloped toward said drinking reservoir, said aperture extending to said bottom of said valve chamber for allowing the debris in said valve chamber to pass to said drinking reservoir, said inlet valve having an inlet channel for directing the water toward said bottom of said valve chamber for washing the debris out of said valve chamber, said valve chamber having a notch for receiving said inlet valve, said inlet valve and said valve chamber further having interacting tab means and opening means for slidably receiving said inlet valve during assembly and for securely holding said inlet valve in a unique, predetermined orientation in said notch.

2. A watering dish according to claim 1 wherein said valve chamber includes opposed sides tapering toward said notch, and said opening means are in said opposed sides.

3. A watering dish according to claim 2 wherein said tab means include tapered outer surfaces for cooperating with said opposed sides to assist in sliding the inlet valve into position.

4. A watering dish according to claim 3 wherein said inlet valve further includes opposed flanges for engaging opposite sides of the valve chamber in the vicinity of the notch.

5. A watering dish according to claim 1 wherein said inlet valve includes a float for closing said valve when at a predetermined height.

6. A watering dish comprising:

a valve chamber, an inlet valve for placement in said valve chamber for supplying water to said valve chamber, and a drinking reservoir in fluid communication with said valve chamber, wherein said valve chamber includes a notch for receiving said inlet valve, and said inlet valve and said valve chamber further include interacting tab means and opening means for slidably receiving said inlet valve during assembly and for securely holding said inlet valve in a unique, predetermined orientation in said notch.

7. A watering dish according to claim 6 wherein said valve chamber further includes opposed sides tapering toward said notch.

8. A watering dish according to claim 7 wherein said tab means include tapered outer surfaces for cooperating with said opposed sides to assist in sliding the inlet valve into position.

9. A watering dish according to claim 8 wherein said inlet valve further includes opposed flanges for engaging opposite sides of the valve chamber in the vicinity of the notch.

10. A watering dish according to claim 9 wherein said inlet valve includes a float for closing said valve when at a predetermined height.

11. A watering dish according to claim 6 wherein said valve chamber has a sloped bottom and said inlet valve includes an inlet channel for directing water toward said bottom for washing debris out of said valve chamber.

* * * * *